United States Patent
Beer et al.

(10) Patent No.: US 11,326,640 B2
(45) Date of Patent: May 10, 2022

(54) FASTENING ELEMENT

(71) Applicant: Bossard AG, Zug (CH)

(72) Inventors: Florian Beer, Burglengenfeld (DE);
Tobias Wolf, Illerrieden (DE)

(73) Assignee: Bossard AG, Zug (CH)

( * ) Notice: Subject to any disclaimer, the term of this patent is extended or adjusted under 35 U.S.C. 154(b) by 428 days.

(21) Appl. No.: 16/060,595

(22) PCT Filed: Dec. 9, 2016

(86) PCT No.: PCT/EP2016/080514
§ 371 (c)(1),
(2) Date: Aug. 9, 2018

(87) PCT Pub. No.: WO2017/098016
PCT Pub. Date: Jun. 15, 2017

(65) Prior Publication Data
US 2018/0372144 A1    Dec. 27, 2018

(30) Foreign Application Priority Data

Dec. 9, 2015  (DE) ..................... 10 2015 121 477.6
Jun. 1, 2016  (DE) ..................... 10 2016 110 118.4

(51) Int. Cl.
*F16B 37/06*   (2006.01)
*F16B 5/04*    (2006.01)
(Continued)

(52) U.S. Cl.
CPC .............. *F16B 37/067* (2013.01); *F16B 5/04* (2013.01); *F16B 31/028* (2013.01); *F16B 43/009* (2013.01)

(58) Field of Classification Search
CPC ................ F16B 37/067; F16B 19/1045; F16B 19/1054; F16B 19/1072; F16B 19/1063;
(Continued)

(56) References Cited

U.S. PATENT DOCUMENTS 2,403,330 A    7/1946  Warren
2,516,553 A    7/1950  Cole
(Continued)

FOREIGN PATENT DOCUMENTS

DE    3109601 A1    9/1982
DE    69405925 T2   4/1998
(Continued)

OTHER PUBLICATIONS

Search Report for German Application No. 10 2016 110 118.4.
International Search Report for International Application PCT/EP2016/080514, dated Mar. 14, 2017.

*Primary Examiner* — Flemming Saether
(74) *Attorney, Agent, or Firm* — Marshall, Gerstein & Borun LLP (57) ABSTRACT

A fastening element (10) comprising a screw (1) with a screw head (11) and a sleeve-shaped rivet arrangement (2) through which the screw (1) passes. Starting from the screw head, the rivet arrangement (2) has an installation spacer region (21), a deformation region (22) and a drive region (23) into which the screw is screwed. Seen from the drive region (23) to the screw head, the circumferential boundaries of the drive region (23) lie within the boundaries of the deformation region (22), the boundaries of the installation spacer region (21) protrude radially over the boundaries of the deformation region (22), and the boundaries of the screw head protrude radially over the boundaries of the installation spacer region (21). The installation spacer region (21) and the deformation region (22) are designed in such a manner that, as the screw is tightened, first of all plastic deformation of the deformation region (22) occurs.

18 Claims, 4 Drawing Sheets

(51) Int. Cl.
*F16B 31/02* (2006.01)
*F16B 43/00* (2006.01)

(58) Field of Classification Search
CPC ........ F16B 7/0413; F16B 5/04; F16B 31/028; F16B 5/0233; F16B 43/009; Y10T 24/3683; Y10T 24/3685
USPC ...... 411/34, 5, 581, 851, 9, 10, 11, 546, 535
See application file for complete search history.

(56) References Cited

U.S. PATENT DOCUMENTS

| | | | | |
|---|---|---|---|---|
| 4,020,734 | A * | 5/1977 | Bell | F16B 31/028 411/10 |
| 4,289,061 | A * | 9/1981 | Emmett | F16B 43/00 411/34 |
| 5,213,460 | A * | 5/1993 | Sadri | F16B 19/1054 411/361 |
| 5,586,851 | A * | 12/1996 | Haage | F16B 31/028 411/10 |
| 6,022,054 | A * | 2/2000 | Hemphill | B29C 65/5042 285/398 |
| 8,262,329 | B2 * | 9/2012 | Wille | F16B 19/1072 411/34 |
| 8,444,356 | B2 * | 5/2013 | Crutchley | F16B 35/048 411/107 |
| 2002/0141844 | A1 * | 10/2002 | Aldama | F16B 19/1081 411/34 |
| 2002/0192047 | A1 * | 12/2002 | Wille | F16B 37/067 411/34 |
| 2005/0158138 | A1 * | 7/2005 | Schneider | F16B 37/067 411/43 |
| 2005/0210771 | A1 | 9/2005 | Kuenzel | |
| 2006/0045650 | A1 * | 3/2006 | Donovan | F16B 35/041 411/106 |
| 2013/0129442 | A1 * | 5/2013 | Schruff | F16B 37/065 411/43 |
| 2013/0205573 | A1 * | 8/2013 | Kashimura | F16B 39/284 29/523 |
| 2014/0037398 | A1 | 2/2014 | Grojean et al. | |

FOREIGN PATENT DOCUMENTS

| | | | | |
|---|---|---|---|---|
| DE | 10253888 A1 | 12/2003 | | |
| DE | 102011014656 A1 | 9/2012 | | |
| GB | 797729 A | * | 7/1958 | ............ F16B 31/028 |
| WO | WO-2012147068 A1 | 11/2012 | | |

* cited by examiner

FASTENING ELEMENT

CROSS-REFERENCE TO RELATED APPLICATIONS

This is the United States National Stage of PCT Application No. PCT/EP2016/080514, filed Dec. 9, 2016, which claims priority to German Patent Application No. 10 2016 110 118.4, filed Jun. 1, 2016, and German Patent Application No. 10 2015 121 477.6, filed Dec. 9, 2015. The entire contents of each of the foregoing applications are incorporated herein by reference.

FIELD OF THE INVENTION

The present invention refers to a fastening element and a rivet connection that is established by means of the fastening element. In addition, the present invention refers to a spacer control element and a use of the same.

BACKGROUND

Various fastening solutions for fastening situations that are accessible from one side only are known from the state of the art.

Such a fastening solution is provided by the so-called blind rivet connection that are in particular suitable for connecting thin-walled materials where it is often not possible to cut a thread directly into the material.

Well known blind rivet connections comprise a blind rivet nut and a mandrel, wherein for setting the blind rivet connection, the mandrel is screwed into the blind rivet nut and the blind rivet nut is positioned into a preprepared bore of an element or metal sheet. An axial load that acts in a direction away from the element or metal sheet and affects the mandrel, produces an extension of the deformation region of the blind rivet nut by means of the mandrel and therefore a formation of a bulge on the blind side of the element. After the turning out of the mandrel, the set blind rivet nut can be used for a screw connection.

The disadvantage of such known blind rivet connection is that multiple working steps are required for mounting such a blind rivet connection.

GENERAL DESCRIPTION

For the present invention, the problem to be solved is therefore to provide a fastening element that overcomes the disadvantages of the state of the art.

The problem is solved by the subject matter of the independent patent claims.

Accordingly, a first aspect of the invention refers to a fastening element for establishing a blind rivet nut connection between in particular panel-shaped elements. The fastening element comprises a screw with a screw head radially extending over the screw shaft and a sleeve-shaped rivet arrangement through which the screw passes. Starting from the screw head, the rivet arrangement consecutively comprises an installation spacer region, a deformation region, and a drive region with an internal thread into which the screw is screwed. The term circumferential boundaries refers in particular the extension of a region in a radial direction. Seen in an axial direction from the drive region towards the screw head the circumferential boundaries of the drive region fall within the circumferential boundaries of the deformation region. The circumferential boundaries of the installation spacer region radially extend over the circumferential boundaries of the deformation region. However, the installation spacer region can comprise sections with circumferential boundaries that do not extend over those of the deformation region. The circumferential boundaries of the screw head extend again radially over the circumferential boundaries of the installation spacer region and over the circumferential boundaries of the deformation region. The installation spacer region and the deformation region are designed in such a manner that for an intended use of a fastening element with the deformation region arranged in a bore in a panel-shaped element, as the screw is tightened by rotation of the same in a screw-in direction in the internal thread of the drive region, first of all plastic deformation of the deformation region occurs in such a manner that the axial length thereof is shortened and the circumferential boundaries thereof are radially enlarged, and then a shortening of the axial length of the installation spacer region occurs.

In a preferred embodiment of the invention, the installation spacer region is formed in such a manner that the axial shortening of the length is caused by an elastic or plastic deformation or by a relative movement of components under friction.

In a further preferred embodiment the installation spacer region can be formed in such a manner that the shortening of the axial length is caused by an elastic or plastic radial extension of the circumferential boundaries of the installation spacer region.

Preferably, the circumferential boundaries of the deformation region are at least in a section of its axial extension not rotationally symmetric.

The deformation region might for example have an essentially annular cross section with a circular or polygonal, e.g. hexagonal (nut-shaped), outer contour.

Alternatively, the deformation region might have an essentially circumferential boundary that preferably comprises a knurled region.

Such a design enables a rotational positive and/or force locking of the deformation region with the boundaries of an opening, in particular a bore, in which the fastening element is set as intended.

Preferably, the installation spacer region is formed in a manner that only if an axial preload force that is created by screwing-in the screw into the internal thread of the drive region that acting on it is exceeded, a shortening of the axial length of the installation spacer region occurs, which shortening is preferably caused by means of plastic or elastic deformation.

In a preferred embodiment of the fastening element, the installation spacer region is partially formed as an annular body made of a, preferably ductile, material that is well formable under compressive stress.

The axial length shortening of the installation spacer region occurs by means of plastic deformation of the material.

Preferably, the material of the annular body is a metal foam, a wrought alloy, a thermoplastic or a duroplastic. The material might be incompressible.

In a further preferred embodiment, the installation spacer region is partially formed as a pipe or sleeve. The axial length shortening of the installation spacer region occurs then preferably by means of elastic or plastic deformation of the pipe or the sleeve. In particular, the pipe or sleeve comprises a structural weak spot, such that the pipe or the sleeve is deformed specifically in this weak spot, viz. in particular bent in this weak spot, buckling towards the inside or the outside. The weak point can be manufactured for example by means of reduction of the cross section of the material of the pipe or the sleeve in this spot or by means of partially soft annealing of the material in this spot.

In a further embodiment of the fastening element, the installation spacer region is designed partially as a pipe or sleeve with a predetermined outside buckling spot such that the pipe or the sleeve is buckling towards the outside if a certain axial load is exceeded, for shortening the axial length of the installation spacer region.

In a further preferred embodiment of the fastening element, the installation spacer region comprises a first abutment ring that has a circumferential cone-shaped first bevel on its one side and a second abutment ring that has a circumferential cone-shaped second bevel fitting the first bevel on its one side facing the first bevel. One of the two rings has a circumferential recess. The two rings are designed in manner such that for shortening the axial length of the installation spacer region, the two abutment rings dive into each other by means of reduction respectively extension of the diameter of the recessed abutment ring.

In a further embodiment, one of the two abutment rings, in particular the one ring that does not have the circumferential recess, can be attached to a lower side of the screw head by means of material engagement.

Preferably, the installation spacer region has a flange or shoulder in a region adjoining the deformation region that has an outer diameter that is larger than circumferential boundaries of the deformation region.

In an embodiment of the fastening element, the rivet connection is formed from one piece.

In a preferred embodiment of the fastening element, the deformation region and/or the drive region and/or the installation spacer region are formed together from one piece.

Preferably, the deformation region and the installation spacer region are formed from a common piece.

In particularly preferable are the deformation region and the drive region formed from a common piece.

In a further preferred embodiment are the deformation region, the drive region and the flange or the shoulder of the installation spacer region built in one piece.

A second aspect of the invention refers to a rivet connection that is established between at least two components, in particular between two panels with a fastening element according to any one of the preceding claims.

A further aspect of the invention refers to a spacer control element.

1. The spacer control element for keeping a predeterminable distance between its two effective sides if a force that affects them is below a determined force, which distance reduces if the given force is exceeded, characterized by a first abutment ring that has a circumferential cone-shaped first bevel on its one side and by a second spring abutment ring that has on its one side facing the first bevel a circumferential conus-shaped bevel fitting the first bevel.

The spacer control element as a component kit with two loose abutment rings can be used in a variety of ways. Further it can and preferably the first abutment ring with its side facing away from its first side is bound by means of material engagement to a lower side of the screw head of a set screw of a blind rivet element and therefore not loosely set.

In any case, if a determined force is exceeded the interaction of the two bevels and the unequal diameters of the two abutment ring between the two effective sites leads to a diving of the two abutment rings into each other by means of the reduced diameter of the spring abutment ring and therefore results in a reduction of the distance between them.

Advantageously, the spacer control element as mentioned before is applied for the use with a blind rivet element, in particular with a blind rivet nut.

Advantageous embodiments and appropriate further developments of the spacer control element are characterized in the dependent claims 12 to 18.

BRIEF DESCRIPTION OF THE DRAWINGS

Further embodiments, advantages and uses of the invention reveal from the dependent claims and the following description according to the figures. Therefore it is shown:

FIG. 3*a*) a cross-section view of a third embodiment of a second inventive fastening element and FIG. 3*ai*) a cut view along the cutting line A;

FIG. 3*b*) the embodiment of the fastening element from FIG. 3*a*) after the screw is partially tightened and 3*bi*) a cut view along the cutting line B;

FIG. 3*c*) the embodiment of the fastening element from FIG. 3*a*) after the screw is completely tightened and 3*ci*) a cut view along the cutting line C;

DETAILED DESCRIPTION

Figure 1:
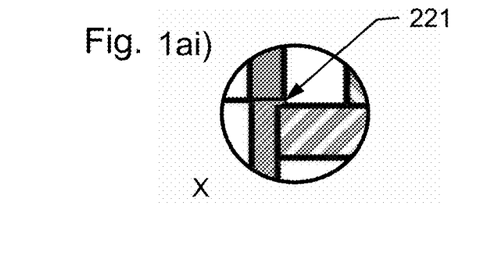
Figure 1A:
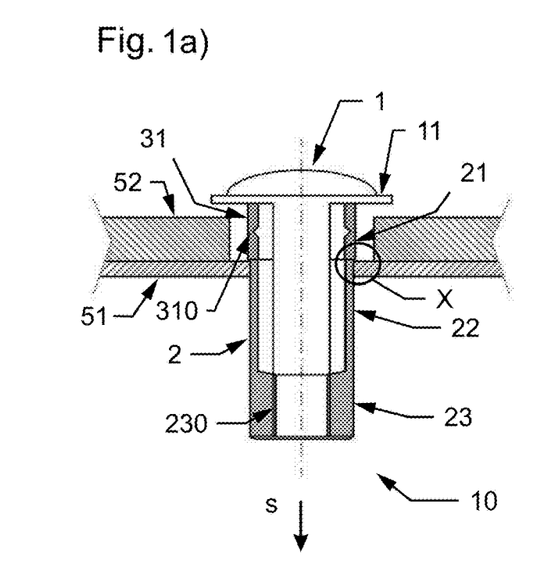
FIG. 1*a*) a cross-section view of a first embodiment of an inventive fastening element and FIG. 1*ai*) a view of the detail X.
Figure 1B:
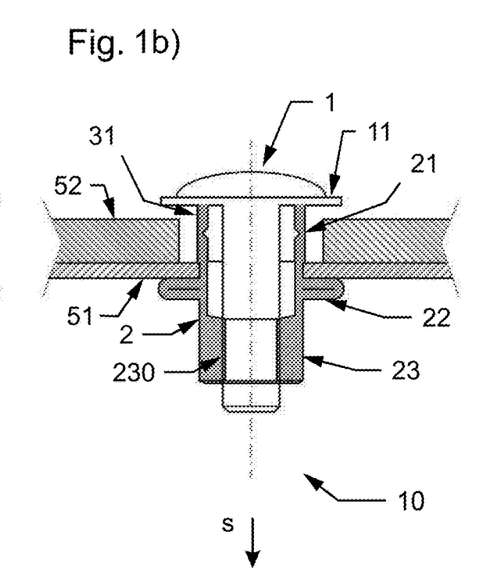
FIG. 1*b*) the embodiment of the fastening element from FIG. 1*a*) after the screw is partially tightened.
Figure 1C:
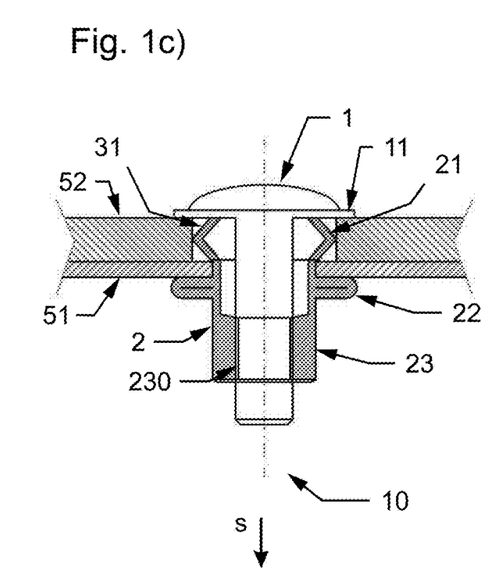
FIG. 1*c*) the embodiment of the fastening element from FIG. 1*a*) after the screw is completely tightened.
Figure 2A:
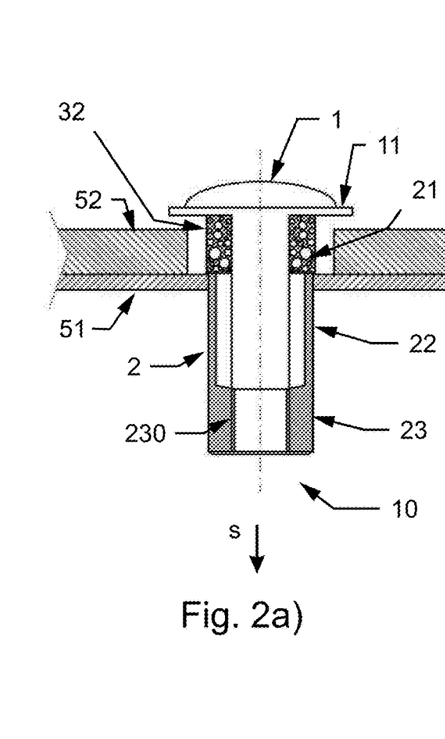
FIG. 2*a*) a cross-section view of a second embodiment of a second inventive fastening element.
Figure 2B:
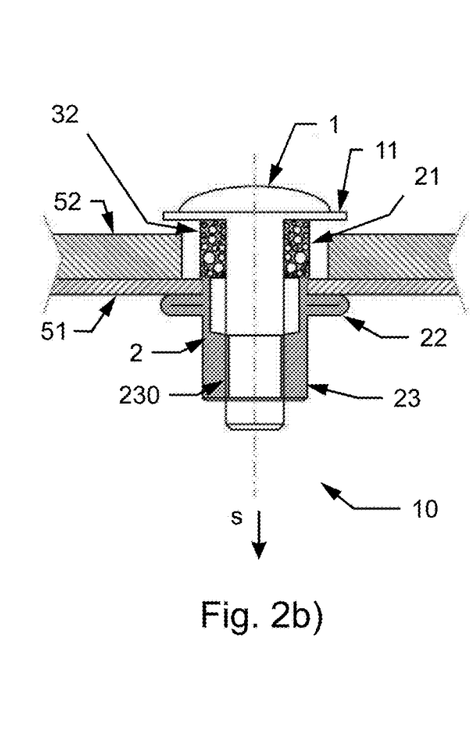
FIG. 2*b*) the embodiment of the fastening element from FIG. 2*a*) after the screw is partially tightened.
Figure 2C:
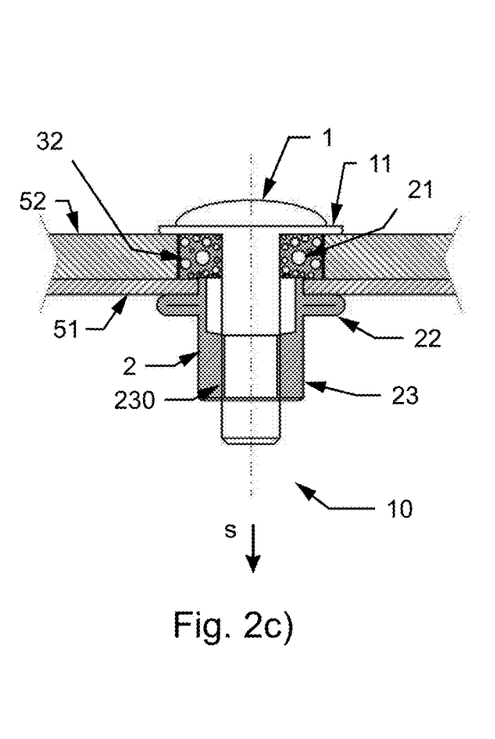
FIG. 2*c*) the embodiment of the fastening element according to FIG. 2*a*) after the screw is completely tightened.
Figure 3:
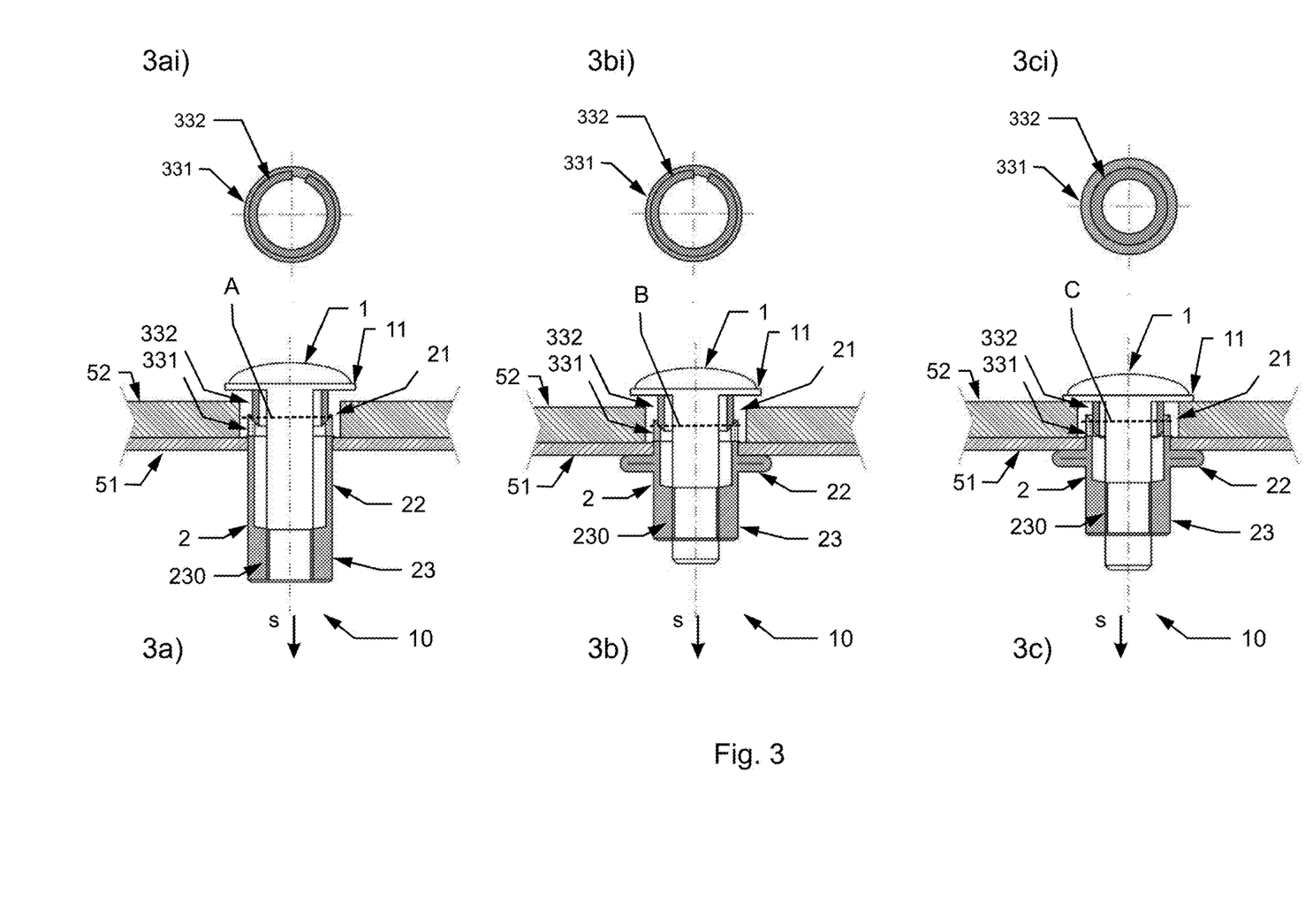

All embodiments shown in FIGS. 1 to 3 of the inventive fastening element 10 are arranged in their intended arrangement with the deformation region 22 in a bore of a first panel-shaped component 51 and comprise the following features:

The fastening element 10 comprises a screw 1 with a screw head 11 radially extending over the screw shaft and a sleeve-shaped rivet arrangement 2 through which the screw 1 passes. The rivet arrangement 2 starting from the screw head 11 consecutively comprises an installation spacer region 21, a deformation region 22 and a drive region 23 with an internal thread 230, into which the screw 1 is screwed. The deformation region 22 has an essentially ring-shaped cross section with a circular or polygonal, e.g. hexagonal (nut-shaped) outer contour.

Seen in an axial direction from the drive region 23 towards the screw head 11, the circumferential boundaries of the drive region 23 fall within the circumferential boundaries of the deformation region 22 and therefore also within the cross section of the bore of the first panel-shaped component 51.

The circumferential boundaries of the installation spacer region 21 radially extend over the circumferential boundaries of the deformation region 22. In addition, the circumferential boundaries of the installation spacer region 21 further extend over the bore of the first panel-shaped component 51, to prevent the installation spacer region 21 from entering said bore. In the embodiments shown in FIGS. 1 to 3, the installation spacer region 21 forms a shoulder 221 in a region adjacent to the deformation region 22 as illustrated in detail X of FIG. 1ai).

The circumferential boundaries of the screw head 11 extend again over the circumferential boundaries of the installation spacer region 21 and over the circumferential boundaries of the deformation region 22.

In the embodiments shown in FIGS. 1, 2, and 3, the circumferential boundaries of the screw head 11 extend additionally over a bore in a second component 52 that shall be connected with the first component 51 by means of the fastening element 10 in a force-locking manner. The bores of the first component 51 and the second component 52 are therefore coaxially arranged.

If there is no other reference system mentioned, the axial orientation in the description of the figures always refers to the axial direction seen from the drive region 23 to the screw head 11, or to the longitudinal axis of the screw 1.

FIG. 1a) shows a first embodiment of a first inventive fastening element 10.

For this embodiment, the installation spacer region 21 is partially designed as a sleeve 31 with a predetermined buckling spot 310. The sleeve 31 is formed in a way that it buckles radially to the outward if a load applied in axial direction exceeds a specific buckling load determined for the sleeve 31.

The predetermined buckling spot 310 is preferably arranged within a middle height of the axial extension of the installation spacer region 21.

As described above, detail X shows the formation of a region of the installation spacer region 11 that adjoins the deformation region 22. For the intended arrangement of the fastening element 10 in the bore of the first panel-shaped component 51, the shoulder 221 around the bore rests on the top side of the first component 51 that is directed towards the screw head 11.

The deformation region 22 is formed in such a manner that tightening of the screw in a direction s by means of rotating the same in a screw in direction into the internal thread 230 of the drive region 23 leads to a plastic deformation of the deformation region 22.

FIG. 1b) shows the inventive fastening element according to the first embodiment after the screw 1 was rotated in screw in direction. The deformation region 21 experiences a plastic deformation wherein the axial length of the same shortens and a bulge forms on the backside of the first component 51. The drive region 23 and the deformation region 22 cannot be shifted anymore against the first component 51 in axial direction.

The installation spacer region 21 is designed in such a manner that a further tightening of the screw 1 by rotating it in screw in direction into the internal thread 230 of the drive region 23 leads to a deformation of the deformation region 22 and its axial shortening followed by a shortening of the axial length of the installation spacer region 21.

As shown in FIG. 1c), the sleeve 31 starts to buckle close to the predetermined buckling spot if the screw 1 is further tightened into the internal thread 230 of the drive region 23.

The axial load acting on the sleeve 31 is caused by the tightening of the screw 1. Under the load, the sleeve 31 buckles radially towards the outside, wherein a radial extension is limited by means of the boundaries of the bore of the second component 52. At the same time as the axial length of the installation spacer region 21 shortens, the distance between the lower side of the screw head 11 and the upper side of the second component 52 facing the screw head 11 decreases, until the lower surface of the screw head 11 finally rests on the upper side of the second component 52, such that both components 51, 52 are clamped between the bulge of the deformation region 22 and the lower side of the screw head 11.

FIG. 2a) shows a second preferred embodiment of the inventive fastening element 10. The embodiment distinguishes solely by the different formation of the installation spacer region from the first embodiment in FIG. 1a). The installation spacer region 21 is here designed as an annular body 32. The annular body 32 is made of a material that is well cold forming under a determined compressive stress. The region of the installation spacer region 21 that adjoins the deformation region 22 is designed as a shoulder 221 like in the first embodiment.

FIG. 2b shows the inventive fastening element of the second embodiment after the screw 1 in screw in direction is rotated. Like for the First Embodiment, the Deformation Region 21 experiences a plastic deformation that shortens the axial length of the same and wherein a bulge forms at the back side of the first component 51

Like in the first embodiment, the installation spacer region 21 is designed in a manner that further tightening of the screw 1 by rotating the same in screw in direction in the internal thread 230 of the drive region 23, the deformation of the deformation region 22 and its shortening is followed by the shortening of the axial length of the annular body 32.

As shown in FIG. 2c), the annular body 32 starts to plastically deform if the screw 1 is further screwed into the internal thread 230 of the drive region 23.

The axial load acting on the annular body 32 is generated by tightening the screw 1. The annular body 32 deforms radially outwardly, wherein a radial extension is limited by the boundaries of the bores of the second component 52. Simultaneously with the shortening of the axial length of the installation spacer region 21 reduces also the distance between the lower side of the screw head 11 and an upper side of the second component 52 that is directed towards the screw head 11, as described for FIG. 1c) referring to the first embodiment.

FIG. 3a) shows a third preferred embodiment of the fastening element 10. This embodiment distinguishes by the partially differently designed installation spacer region 21 from the first and second embodiment in FIGS. 1a) and 2a) respectively. The installation spacer region 21 is designed in such a manner that it has a first abutment ring 331 that has a circumferential conus-shaped first bevel on its one side and a second abutment ring 332 that has a circumferential, conus-shaped second bevel fitting the first bevel on its one side facing the first bevel. The second abutment ring 332 that has a smaller diameter than the first abutment ring 332 has further a circumferential recess, it is therefore a so called spring abutment ring. To illustrate the two abutment rings 331, 332, Fig. 3ai) shows a sectional view of the two abutment rings 331, 332 along the cutting line A in FIG. 3a).

The two abutment rings 331, 332 are designed in a manner that they interlock into each other for shortening the axial length of the installation spacer region 21 by means of shortening the diameter of the recessed second abutment ring 332.

FIG. 3*b*) shows the inventive fastening element of the third embodiment after the screw 1 is rotated in screw in direction. Like for the first and the second embodiment, the deformation region 22 experiences a plastic deformation, therefore shortening the axial length of the same and forming a bulge on the backside of the first component 51.

FIG. 3*bi*) shows an arrangement of the abutment rings 331, 332 in a cut along the cutting line B of the fastening element. The two rings 331, 332 are aligned with each other in the original arrangement. The two abutment rings 331, 332 are designed in a manner such that the required axial force for pushing the rings 331, 332 together is larger than the one required for deforming the deformation region 22.

Like for the first and the second embodiment, the deformation region 22 is designed in a manner that if the screw 1 is further tightened by rotation of the same in screw in direction in the internal thread 230 of the driving region 23, the deformation of the deformation region 22 and its shortening is followed by the shortening of the axial length of the installation spacer region 21.

This is done by the forces, acting on the two abutment rings 51, 52, getting large enough by further screwing in the screw 1 into the internal thread 230, such that they exceed the friction forces between the rings 331, 332 and the pretensioning force of the second recessed ring 52, such that the second abutment ring 52 is compressed, its diameter decreases and it is sliding into the first abutment ring 51, as shown in FIG. 3*c*).

FIG. 3*ci*) shows an abutment ring 331, 332 in a section view C of FIG. 3*c*), wherein the radius of the recessed second abutment ring 332 is decreased in such a manner that it slides into the first abutment ring.

The axial load acting on the abutment rings 331, 332 is generated by tightening the screw 1. Under this axial load, the second recessed abutment ring 332 is pushed into the first abutment ring 331, wherein the axial length of the installation spacer region 21 shortens. At the same time as the axial length installation spacer region 21 is shortened, the distance between the lower side of the screw head 11 and an upper side of the second component 52 facing towards the screw head 11 is shortening.

Figure 4A:
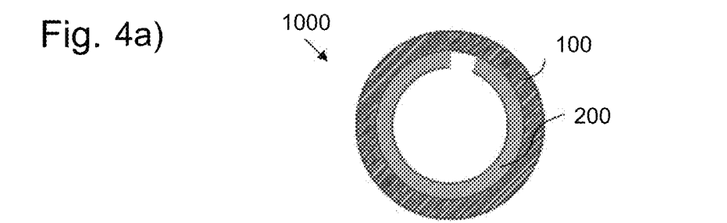
FIG. 4*a* in top view an implementation example for the spacer control element according to the present invention.
Figure 4B:
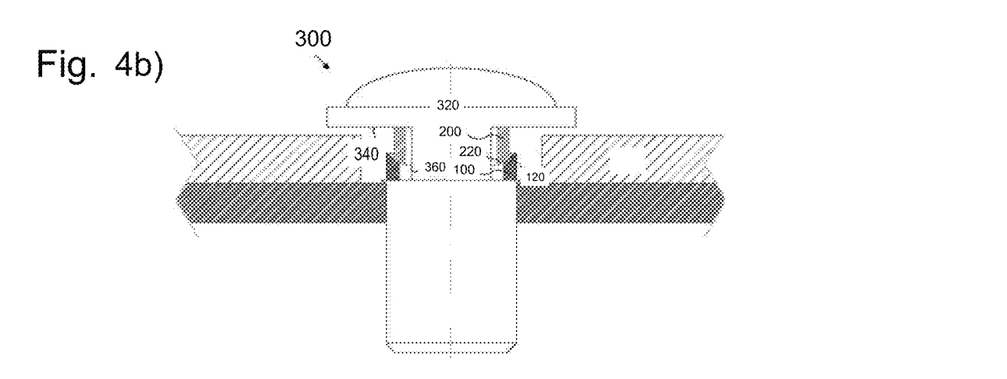
FIG. 4*b* a cut view of an implementation example for the arrangement of the spacer control element from FIG. 4*a* in relation to a blind rivet element, before a determined force is exceeded.
Figure 4C:
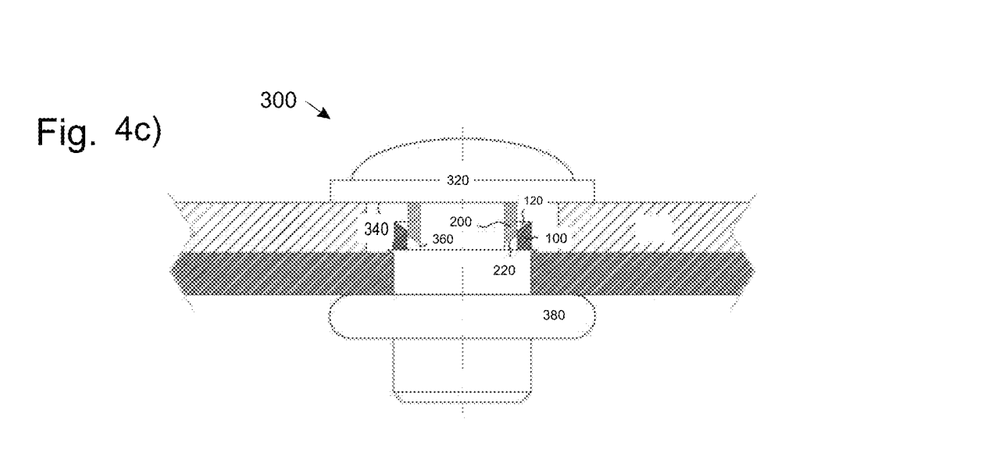
FIG. 4*c* a cut view of an implementation example for an arrangement of a spacer control element from FIG. 4*a* in relation to a blind rivet element after a determined force is exceeded.

The spacer control element 1000 illustrated in FIG. 4 serves for keeping a predetermined distance (see FIG. 4*b*) between its two acting sides under a predetermined force acting on it, wherein the distance is decreasing if a determined force is exceeded (see FIG. 4*c*).

The spacer control element 1000 shows a first abutment ring 100 that has a first abutment ring 100 with a circumferential cone-shaped first bevel 220 on its one side and a recessed second abutment ring 200 facing the first bevel 120 with a circumferential cone-shaped second bevel 120 fitting the first bevel 120.

The diameter of the second abutment ring 200 is smaller than the diameter of the first abutment ring 100.

Like shown in the exemplary illustration in FIG. 4*b*, the second abutment ring 200 with its side facing away from its first bevel 120 is set by means of material engagement to the circular bottom side 340 of a head 320 of a blind rivet element 300, in particular of a blind rivet nut. Adjacent to the head 320 there is a hollow shaft 360, its outer side having a smaller diameter than the head 320. An internal thread is arranged within the hollow shaft 360 with an axial distance to the head 320.

By the two cone-shaped bevels 120 and 220 contacting each other and having different diameters, the two abutment rings 100 and 200 dive into each other if a determined force is exceeded while the diameter of the recessed second abutment ring 200 is decreasing and therefore the distance is decreasing, such that the distance can be controlled.

In principle, there are two concentric rings 100 and 200 touching each other with a cone between head of the screw and insert head. The first abutment ring 100 is closed and the second abutment ring 200 is springed and therefore open.

If the two abutment rings 100 and 200 are pressed together, the second spring ring 200 slides along the first ring 100 and shortens their common height; However, this shortening only happens after the bulge 380 is completely built up (see FIG. 4*c*).

The closed ring 100 can be designed as part of the blind rivet element 300, this means that the functioning viz. the design of the closed ring 100 can be integrated into the blind rivet element 300; the spring ring 200 can be arranged freely around the screw. In such an arrangement, the fixed relative arrangement is built indirectly from the screw to the insert head.

Also the loose arrangement of the two abutment rings 100, 200 is possible, this means that the space control element 100 can be designed as a separate viz. independent component.

Independently from the pre-shaping viz. independent design of the two abutment rings 100, 200 slides the spring ring 200 with its bevel 220 over the bevel 120 of the closed ring, such that the screw can set on the most upper component.

In any case, the rings 100, 200 can be reused after their usage, if a certain elasticity of the spring ring 200 is given, because there is no irreversible deformation of the spring ring 200; furthermore, no shearing or breaking takes place, only buckling without destruction.

While the present application describes preferred embodiment of the invention, it is clearly mentioned that the invention is not limited to those and can also be embodied in another manner if within the scope of the following claims.

The invention claimed is:

1. Fastening element for producing a blind rivet connection between in particular panel-shaped components, comprising
    a screw with a screw head radially extending over the screw shaft and
    a sleeve-shaped rivet arrangement through which the screw passes and starting from the screw head consecutively comprises
        an installation spacer region
        a deformation region and
        a drive region with an internal thread into which the screw is screwed,
    wherein seen in an axial direction from the drive region towards the screw head
        the circumferential boundaries of the drive region fall within the circumferential boundaries of the deformation region,
        the circumferential boundaries of the installation spacer region radially extend over the circumferential boundaries of the deformation region and
        the circumferential boundaries of the screw head radially extend over the circumferential boundaries of the installation spacer region and the circumferential boundaries of the deformation region, and wherein the installation spacer region and the deformation region are formed in such a manner that, as the screw is tightened by rotation of the same in screw-in direction in the internal thread of the drive region, first of all plastic deformation of the deformation region occurs in such a manner that an axial length thereof is shortened and the circumferential boundaries thereof are radially enlarged, and then a shortening of an axial length of the installation spacer region occurs, wherein the installation spacer region comprises a first abutment ring that has a circumferential cone-shaped first bevel on its one side and a second abutment ring that has a circumferential cone-shaped second bevel fitting the first bevel on its one side facing the first bevel, wherein one of the first and second abutment rings has a circumferential recess, wherein the first and second abutment rings are formed in such a manner that for shortening of the axial length of the installation spacer region, the first and second abutment rings dive into each other by means of reduction or extension of a diameter of the recessed abutment ring.

2. Fastening element according to claim 1, wherein the installation spacer region is formed in such a manner that the axial shortening of the length is caused by an elastic or plastic deformation or by a relative movement of components under friction.

3. Fastening element according to claim 2, wherein the installation spacer region is designed to form an annular body from a material that is formable under compressive stress.

4. Fastening element according to claim 3 wherein the material is a metal foam, a wrought alloy, a thermoplastic or a duroplastic.

5. Fastening element according to claim 2, wherein the installation spacer region is formed partially as a pipe or sleeve with a structural weak spot in the pipe or sleeve, in particular with a predetermined outside buckling spot, such that it is yielding, in particular buckling towards the inside or the outside under a load, if a certain axial load is exceeded.

6. Fastening element according to claim 1, wherein the circumferential boundaries of the deformation region are at least in a section of its axial extension not rotationally symmetric.

7. Fastening element according to claim 1, wherein the installation spacer region is formed in such a manner that the shortening of the axial length occurs under an elastic or plastic radial extension of the installation spacer region.

8. Fastening element according to claim 1, wherein the installation spacer region in its region adjacent to the deformation region, has a flange or a shoulder with an outer diameter that is larger than the outer diameter of the deformation region before deformation of the deformation region.

9. Fastening element according to claim 1, wherein the deformation region and/or the drive region and/or the installation spacer region are formed together from one piece.

10. Rivet connection between at least two elements manufactured with a fastening element according to claim 1.

11. Spacer control element for keeping a predeterminable distance between its two effective sides if a force that affects them is below a determined force, which distance reduces if the given force is exceeded, characterized by a first abutment ring that has a circumferential cone-shaped first bevel on its one side, and by a second spring abutment ring that has on its one side facing the first bevel a circumferential conus-shaped bevel fitting the first bevel, characterized in that the second abutment ring is attachable on a lower side of a head of a blind rivet element with its side that is facing away from its first bevel, characterized in that the first and second abutment rings dive into each other if the determined force is exceeded by means of reduction of a diameter of the second abutment rind.

12. Spacer control element according to claim 11 characterized in that the attachment is by means of material engagement.

13. Spacer control element according to claim 11, characterized in that the blind rivet element is formed as blind rivet nut.

14. Spacer control element according to claim 11, characterized in that a diameter of the first abutment ring distinguishes from a diameter of the second abutment ring.

15. Spacer control element according to claim 14, characterized in that the diameter of the first abutment ring is larger than the diameter of the second abutment ring.

16. Use of a spacer control element according to claim 11, with a blind rivet element with a head, adjacent to it a hollow shaft, its outer side having a diameter smaller than the head and with an internal thread inside the hollow shaft that is arranged with a axial distance from the head.

17. Use according to claim 16 characterized in that the first abutment ring is formed as part of the blind rivet element and/or is integrated in the blind rivet element and the second abutment ring is freely and/or loosely arranged around the hollow shaft.

18. Use according to claim 16, characterized in that the first abutment ring and the second abutment ring are freely and/or loosely arranged around the hollow shaft.

* * * * *

UNITED STATES PATENT AND TRADEMARK OFFICE
CERTIFICATE OF CORRECTION

PATENT NO. : 11,326,640 B2
APPLICATION NO. : 16/060595
DATED : May 10, 2022
INVENTOR(S) : Florian Beer et al.

It is certified that error appears in the above-identified patent and that said Letters Patent is hereby corrected as shown below:

In the Claims

At Column 10, Line 24, "rind." should be -- ring. --.

At Column 10, Line 42, "a axial" should be -- an axial --.

Signed and Sealed this
Eighteenth Day of July, 2023

Katherine Kelly Vidal
*Director of the United States Patent and Trademark Office*